(12) United States Patent
Wang et al.

(10) Patent No.: US 9,994,006 B2
(45) Date of Patent: Jun. 12, 2018

(54) FILM MATERIAL ATTACHING METHOD

(71) Applicants: Boe Technology Group Co., Ltd., Beijing (CN); Beijing Boe Optoelectronics Technology Co., Ltd., Beijing (CN)

(72) Inventors: Hongbin Wang, Beijing (CN); Rong Zhang, Beijing (CN); Kai Yin, Beijing (CN); He Zhang, Beijing (CN); Bingrui Wang, Beijing (CN); Tingzhong Xiong, Beijing (CN); Lei Wang, Beijing (CN); Jingjing Guo, Beijing (CN); Jie Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 296 days.

(21) Appl. No.: 14/786,579

(22) PCT Filed: Mar. 27, 2015

(86) PCT No.: PCT/CN2015/075201
§ 371 (c)(1),
(2) Date: Oct. 23, 2015

(87) PCT Pub. No.: WO2016/082397
PCT Pub. Date: Jun. 2, 2016

(65) Prior Publication Data
US 2016/0339680 A1    Nov. 24, 2016

(30) Foreign Application Priority Data
Nov. 27, 2014    (CN) .......................... 2014 1 0707635

(51) Int. Cl.
| B32B 37/00 | (2006.01) |
| G06F 3/041 | (2006.01) |
| B32B 37/12 | (2006.01) |

(52) U.S. Cl.
CPC ........ B32B 37/0053 (2013.01); B32B 37/003 (2013.01); B32B 37/12 (2013.01);
(Continued)

(58) Field of Classification Search
CPC .......................... B32B 37/003; B32B 37/0053
See application file for complete search history.

(56) References Cited

U.S. PATENT DOCUMENTS

| 7,955,466 B2* | 6/2011 | Nozaki | B29D 11/0073 156/250 |
| 2013/0126080 A1* | 5/2013 | Hirata | B32B 37/003 156/248 |

FOREIGN PATENT DOCUMENTS

| CN | 101561576 | 10/2009 |
| CN | 201859426 | 6/2011 |

(Continued)

OTHER PUBLICATIONS

Machine Translation of Korean Patent 10-2007-0051150, Date Unknown.*
(Continued)

*Primary Examiner* — Jeffry H Aftergut
(74) *Attorney, Agent, or Firm* — Calfee, Halter & Griswold LLP (57) ABSTRACT

The present disclosure relates to a technical field of display panel manufacture, in particular relates to a film material attaching method and a film material attachment device. The method includes: putting a film material on a backing material on a base table, a side of the film material with an adhesive layer facing towards the backing material to be (Continued)

attached and aligning the film material and the backing material; pressing a corner of the film material on the base table by an attaching roller which will roll along a preset direction, wherein an included angle between the preset direction and either side of the corner of the film material is smaller than an angle of the corner of the film material. By attaching the film material using an attaching roller at an angle with respect to the film material, instead of attaching the film material directly at one side by an attaching roller in traditional attaching process, the present disclosure can solve the problem that a linear bubble is easily to be generated at the edge of the film material in the attaching process.

18 Claims, 4 Drawing Sheets

(52) U.S. Cl.
CPC ... *B32B 2307/202* (2013.01); *B32B 2307/416* (2013.01); *B32B 2307/42* (2013.01); *B32B 2457/208* (2013.01); *G06F 3/041* (2013.01); *G06F 2203/04103* (2013.01)

(56) References Cited

FOREIGN PATENT DOCUMENTS

| | | | | |
|---|---|---|---|---|
| CN | 203047565 | | | 7/2013 |
| CN | 104407739 | | | 3/2015 |
| JP | 62-66227 | A | * | 3/1987 |
| KR | 10-2007-0051150 | A | * | 5/2007 |

OTHER PUBLICATIONS

Office Action from China Application No. 201410707635.5 dated Nov. 23, 2016.
International Search Report and Written Opinion from PCT/CN2015/075201 dated Sep. 2, 2015.
Second Office Action from China Application No. 201410707635.5 dated Jun. 1, 2017.
Decision of Rejection for Chinese Patent Application No. 201410707635.5 dated Nov. 16, 2017.

* cited by examiner

FILM MATERIAL ATTACHING METHOD

RELATED APPLICATIONS

The present application is the U.S. national stage entry of PCT/CN2015/75201, filed on Mar. 27, 2015, which claims the benefit of Chinese Patent Application No. 201410707635.5, filed on Nov. 27, 2014, the entire disclosures of which is are incorporated herein by reference.

BACKGROUND OF THE DISCLOSURE

1. Field of the Disclosure

The present disclosure relates to the technical field of display panel manufacture, in particular relates to a film material attaching method and a film material attachment device.

2. Description of the Prior Art

In existing film material attaching process, a film material is usually attached by the cooperation between a cylindrical attaching roller and a planar base table: under the squeezing action of the attaching roller and the planar base table, the adhesive layer between the film material and the backing material will tightly glue and attach the film material and the backing material together. However, in traditional film material attaching process, a kind of linear bubble will be generated near an edge of the film material. If the linear bubble occurs within the display region, a linear stripe will occur in the display screen. Since such linear bubble will influence the display effects and the touch control effects of the touch display, most manufactures will not accept such defects. This is a long-term problem in the field of display panel manufacture and is also one of the difficult challenges faced by the manufacturers in the industry.

As to such problem, a common practice in prior art is to let the linear bubble stay far away from the display region by increasing a non-display area of display panel, at the same time performing a deaeration treatment to such bubble as far as possible (however, existing deaeration methods cannot effectively remove such bubbles). The above mentioned practice can decrease the influences of linear bubbles to display effects and the touch control effects to a certain extent. However, the treatment effect is very limited, and the production cost of the attaching process is increased inevitably. Moreover, such practice also has negative influence to the narrowing of the frame of the display device.

SUMMARY OF THE DISCLOSURE

In light of the drawbacks in the prior art, the present disclosure provides a film material attaching method which can effectively solve the problem that a linear bubble might be generated at an edge of the film material.

In a first aspect, the present disclosure provides a film material attaching method, which comprising:

putting a film material on a backing material on a base table, a side of the film material with an adhesive layer facing towards the backing material to be attached, and aligning the film material and the backing material;

pressing a corner of the film material on the base table by an attaching roller which will roll along a preset direction, wherein the included angle between a preset direction and either side of the corner of the film material is smaller than the angle of the corner of the film material.

Optionally, an included angle between the preset direction and an angle bisector of the corner of the film material is smaller than a third of the angle of the corner of the film material.

Optionally, the preset direction is coincident with the angle bisector of the corner of the film material.

Optionally, in a first half of a whole rolling course, an attaching pressure applied by the attaching roller is smaller than an average attaching pressure of the whole rolling course; and/or, a rolling speed of the attaching roller in the first half of the whole rolling course is smaller than an average rolling speed of the whole rolling course.

Optionally, a rolling trajectory plane of the attaching roller covers the film material.

Optionally, the length of the attaching roller is larger than a projected length of the film material at the plane where the film material lies along a direction perpendicular to the preset direction.

Optionally, the film material is rectangular, and the length of the attaching roller is no less than the diagonal length of the rectangular film material. The included angle between the preset direction and either side of the corner of the film material is an acute angle Optionally, a rolling distance of the attaching roller is larger than a projected length of the film material at the plane where the film material lies along the preset direction.

Optionally, the film material is rectangular, wherein if a length of the short side of the rectangular film material is $L_a$, a length of the long side of the rectangular film is $L_b$, a included angle between the preset direction and the short side is $\alpha$, then the rolling distance Lt will satisfy the relationship:

$$Lt > L_a \cos \alpha + L_b \sin \alpha.$$

Optionally, the material of the adhesive layer comprises optically clear adhesive.

Optionally, the film material comprises any one or more of a polarizer, a reflector, an electronic paper, an isolating paper or a touch control conductive thin film.

From the above technical solution, by pressing the film material using an attaching roller at an angle with respect to the film material, instead of pressing the film material directly at one side by an attaching roller in prior art, the present disclosure can solve the problem that a linear bubble can be easily generated at the edge of the film material in the attaching process. Moreover, comparing to prior art, since the present disclosure solves the problem of linear bubble forming, other special processes are not needed to apply to the film material so that the production cost of the attaching process will be decreased. In addition, because no lineal bubble generate, the non-display area does not need to be increased, which is advantageous to the development of the narrowing of the frame of the display device.

Furthermore, the present disclosure also provides a film material attachment device, comprising: a base table, which is used to carry the backing material needing to attach a film material; an attaching roller, which is located above the base table and is configured to roll and press the film material; and a rolling control unit, which is configured to control the rolling of the attaching roller so that the attaching roller can press a corner of the film material, and roll along a preset direction, wherein the included angle between the preset direction and either side of the corner of the film material is smaller than the angle of the corner of the film material.

According to an aspect of the film material attachment device, the rolling control unit comprises an actuation device and an angle measurement device, wherein, the angle measurement device is configured to measure the included angle between an actual rolling direction of the attaching roller and either side of the corner of the film material, and if the included angle between the actual rolling direction of the attaching roller and either side of the corner of the film material is larger than or equal to the angle of the corner of the film material, the actuation device will regulate the rolling direction of the attaching roller so that the included angle between the actual rolling direction of the attaching roller and either side of the corner of the film material will be smaller than the angle of the corner of the film material.

According to another aspect of the film material attachment device, the rolling control unit further comprises a pressure measurement device and a pressure control device, wherein the pressure measurement device is configured to measure the pressure applied to the film material by the attaching roller; and the pressure control device is configured to control the pressure applied to the film material by the attaching roller so that the applied attaching pressure by the attaching roller during the first half of the whole rolling course is smaller than the average attaching pressure of the whole rolling course.

According to other aspect of the film material attachment device, the rolling control unit is further configured to control the rolling speed of the attaching roller so that the rolling speed in the first half of the whole rolling course is smaller than the average rolling speed of the whole rolling course.

BRIEF DESCRIPTION OF DRAWINGS

In order to more clearly illustrate the embodiments of the present disclosure or the technical solutions in the prior art, the drawings needed in the present embodiment or the prior art will be briefly described. Obviously, based on these drawings, other drawings can be obtained by those ordinary skilled in the art without creative efforts.

DETAILED DESCRIPTION OF THE PRESENT DISCLOSURE

In order to make the object, technical solution and advantages of the preset embodiment clearer, the technical solutions of embodiments of the present disclosure will be clearly and fully described in conjunction with drawings. Obviously, those embodiments are only some embodiments of the present disclosure and not all the embodiments of the present disclosure. Based on these embodiments of the present disclosure, all other embodiments obtained by those ordinary skilled in the art without creative efforts are within the scope of the present disclosure.

In order to more clearly explain the technical solution of the present disclosure, the problem that a linear bubble is easily generated at the edge of the film material in the attaching process will be first explained.

Figure 5:
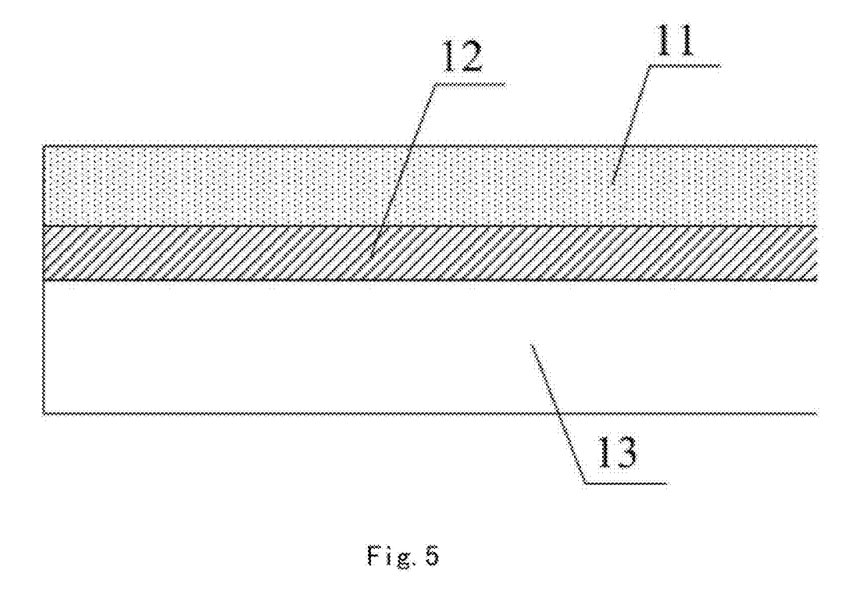
FIG. 5 is a sectional side view of the film material and the backing material in prior art film material attaching process.
Figure 6:
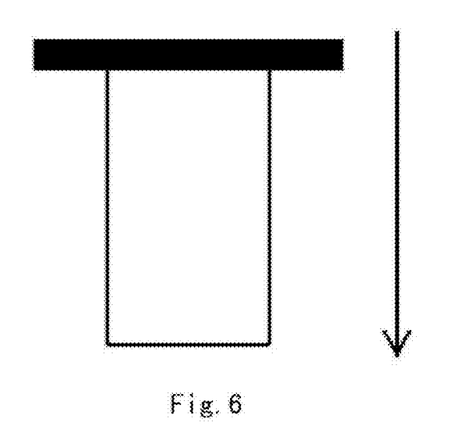
FIG. 6 is a schematic view showing the film material attaching by an attaching roller in prior art film material attaching process.

In existing film material attaching process, the film material usually is attached by the cooperation between a cylindrical attaching roller and a planar base table: under the squeezing action of the attaching roller and the planar base table, the adhesive layer between the film material and a backing material will tightly glue and attachment the film material and the backing material together. Specifically, referring to the sectional side view of the film material and the backing material in prior art film material attaching process shown in FIG. 5, before an attaching roller rolls and performs attaching, a film material 11 with adhesive layer 12 at one side will be placed at the surface of a backing material 13 on a base table. At this time, the adhesive layer 12 has not tightly glued the film material 11 and the backing material 13 yet. Then, the attaching roller (as indicated by a dark bold line in FIG. 6) will roll and perform attaching along one side (as indicated by an arrow in FIG. 6) of the film material (as indicated by a white rectangle in FIG. 6), which can join the film material 11 and the backing material 13 tightly together by the adhesive layer 12 between the film material 11 and the backing material 13 in FIG. 5.

Herein, it is a traditional technical solution to perform attachment by pressing the film material by an attaching roller in parallel to one side of the film material. Such solution is easy and cheap to achieve. However, because most manufacturers perform film material attachment by such solution, the above mentioned linear bubble will be generated. The cause of the linear bubble will be described as follows.

Figure 7:
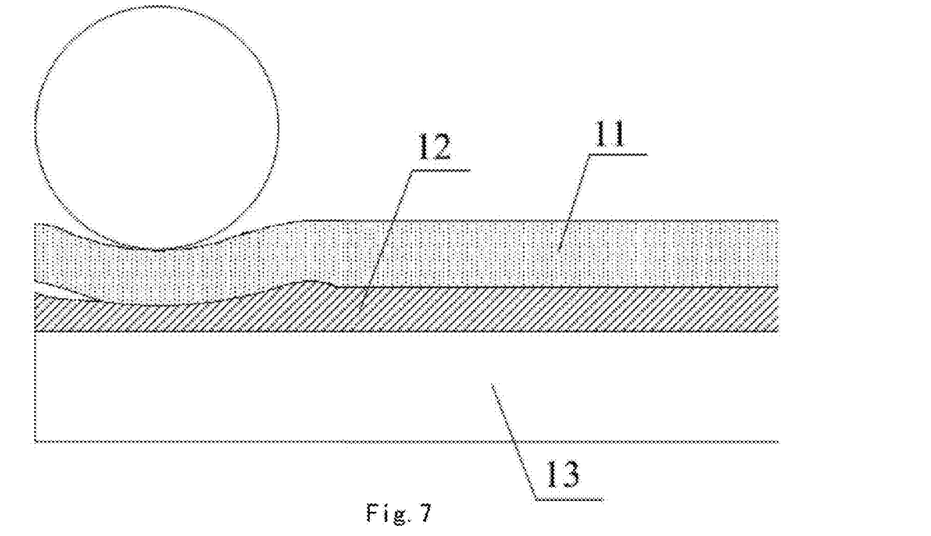
FIG. 7 is a sectional side view of the device when the attaching roller starts to roll in prior art film material attaching process.

Referring to the sectional side view of the device after the attaching roller starts to roll in the in prior art film material attaching process as shown in FIG. 7, after the cylindrical attaching roller (as shown by a circle in FIG. 7, the circle is scaled down in the view for convenient representation) presses an edge of the film material and starts to roll, the film material 11 and the adhesive layer 12 will be deformed as shown in the FIG. 7 under the pressure of the attaching roller, the attaching roller will squeeze the adhesive in the adhesive layer 12 in the rolling direction to a certain extent. Meanwhile, the outmost edge of the film material 11 will detach from the adhesive layer 12 temporally during the rolling process of the attaching roller. Therefore, a small notch will be opened (as shown in FIG. 7, scaled up by a certain extent) so that air can enter between the film material 11 and the adhesive layer 12. At this position, a small gap forms between the film material 11 and the adhesive layer 12 as shown in FIG. 8.

Figure 8:
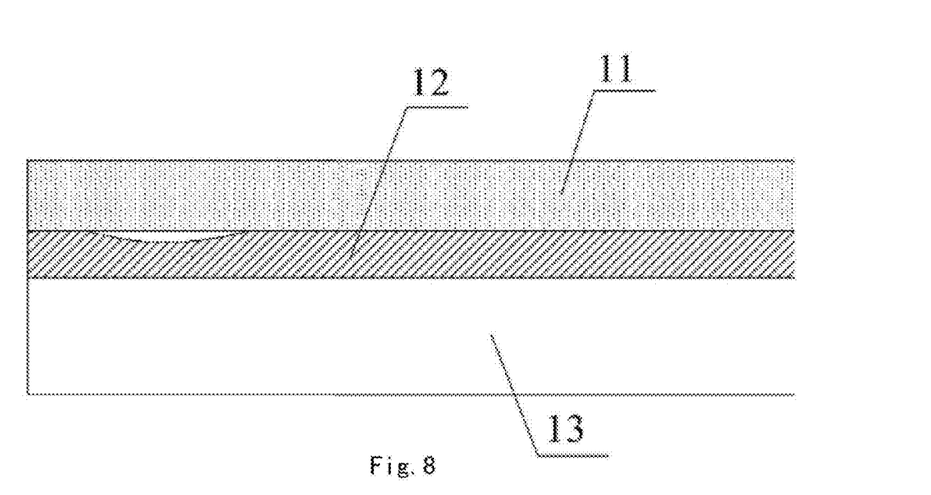
FIG. 8 a schematic view showing a small gap is generated after rolling by the attach roller in prior art film material attaching process.
Figure 9:
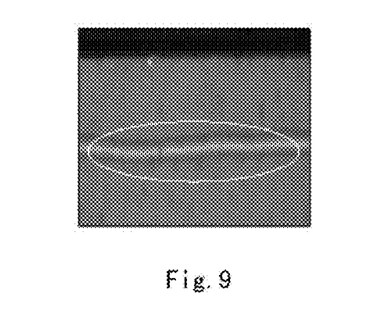
FIG. 9 a schematic view showing a linear bubble can be observed when the backing material is illuminated after the prior art film material attaching process.

Therefore, because the attaching roller is cylindrical, as shown in FIG. 8, small gaps might be generated near the line where the film material 11 and the attaching roller contact initially. Those small gaps generally form a linear bubble. The actual image of the linear bubble can be observed when illuminating the backing material, as shown in FIG. 9 (the linear bubble is marked by a circle in FIG. 9).

Figure 1:
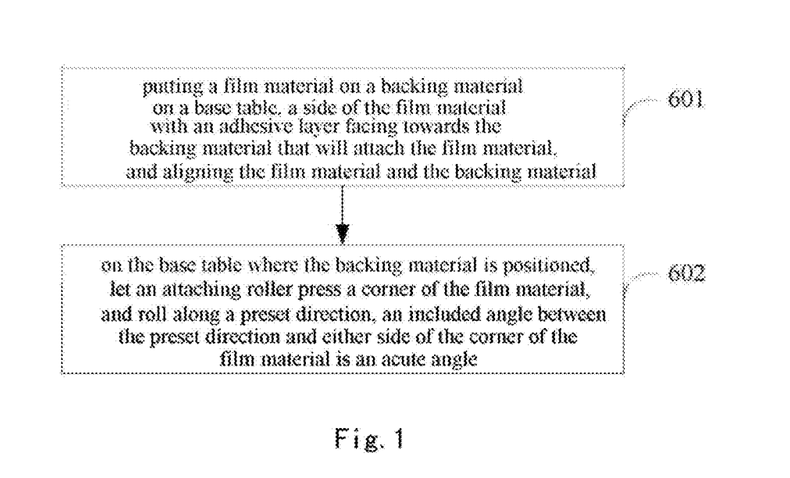
FIG. 1 is a schematic flow chart showing the steps of the film material attaching method according to an embodiment of the present disclosure.

As to this, the present disclosure provides a film material attaching method. The schematic flow chart of the film material attaching method shown in FIG. 1 will be referred. This method comprises:

step 601: putting a film material on a backing material on a base table, a side of the film material with an adhesive layer facing towards the backing material that will attach the film material, and aligning the film material and the backing material; and Step 602: on the base table where the backing material is positioned, let an attaching roller press a corner of the film material, and roll along a preset direction, a included angle between the preset direction and either side of the corner of the film material is smaller than an angle of the corner of the film material.

In the above step 601, some preparation work is performed before attaching the film material, that is: the backing material is placed on the base table at a predetermined position and the side of the film material with adhesive layer is facing downwards and aligned with the backing material to be joined by rolling of the attaching roller. The adhesive in the adhesive layer can specifically comprise optically clear adhesive (OCA) or pressure sensitive adhesive (PSA). The backing material specifically refers to the structure to which the film material to be joined, such as a glass substrate to which a polarizer to be attached, a transparent electrode substrate to which an electronic paper to be attached, a sheet (such as the bottom of a back light source) to which a reflector to be attached, a cover glass to which a touch control conductive thin film to be attached and a glass substrate to which an optically clear adhesive to be attached (one side of the OCA is attached with an isolating paper). The above base table can be a stable planar table, or can be a device with a groove to embed the backing material or other devices that can provide a planar surface for attaching, which is not limited herein. The above mentioned alignment can be made manually or can be made by laser, or can be performed by machine vision, which will not be limited by the present disclosure.

In the above mentioned step 602, the attaching roller starts rolling by pressing a corner of the film material instead of pressing one side of the film material. Meanwhile, in order to keep the rolling process relatively smooth, preferably, the attaching direction (the above mentioned preset direction) of the attaching roller can be perpendicular to the attaching roller. The included angle between the preset direction and either side of the pressed corner is smaller than the angle of the corner of the film material. Therefore, in the initial period since the rolling starts, a rolling trajectory plane of the attaching roller on the film material is in triangular shape whose cross section changes from small to large.

Referring to FIG. 7, in the above mentioned attaching process, at the beginning, only the film material 11 and the adhesive layer 12 at a small contact point where the attaching roller and the film material firstly contact can be deformed by squeezing. Therefore, only a small portion of the adhesive can be squeezed by the attaching roller. The amount of the air entering between the film material 11 and the adhesive layer 12 is very small, so it is hard to form a bubble at this position (the notch initially opened is very small, so there is not much air entering between the film material 11 and the adhesive layer 12, and therefore, the internal air pressure and the stress will force the adhesive back to its original shape). Moreover, even if a bubble forms here, because the bubble is small and near the edge of the film material, it is easy to remove by common deaeration process. Therefore, the problem that a linear bubble is easy to be generated at the edge of the film material in the attaching process can be effectively solved.

It should be noted that because the attaching pressure between the attaching roller and the film material during the rolling process of the above mentioned attaching method can be varied, therefore, the attaching pressure may be in direct proportion to the contact surface area (or the length of the contact line) between the attaching roller and the film material, or a smaller attaching pressure is applied at the attachment starting position and the attachment ending position so that the squeezing degrees of various portions of the film material tend to be uniform.

Specifically, the attaching pressure and/or rolling speed can be set as follows: prior to a preset rolling distance of the attaching roller, the attaching pressure and/or rolling speed is smaller than the average value of the whole rolling course. The preset distance can be set according to the changing curve of the contact surface area between the attaching roller and the film material varying with the position of the attaching roller (e.g., the rolling distance can be taken when the attaching roller rolls to another corner of the film material, changing from pressing adjacent edges of the film material to pressing non-adjacent edges of the film material). In the above setting, in the initial period since the rolling starts, the attaching pressure and/or the rolling speed is smaller than when the attaching roller has rolled past the preset rolling distance, so that the squeezing of the adhesive in the adhesive layer by the attaching roller can be reduced in the initial period as much as possible, so as to reduce the width and depth of the linear bubble at maximum.

It can be seen that the above mentioned attaching method of the film material is not limited to rectangular film material; it is also suitable to film materials with other shapes. The specific shape of the film material is not limited herein.

Figure 2:
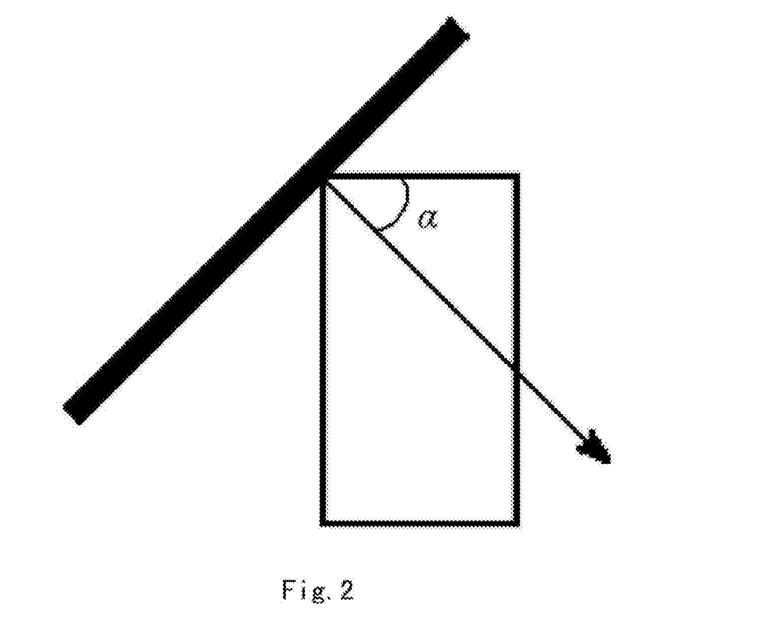
FIG. 2 to FIG. 4 is a top schematic view showing the base table during the rolling process of an attaching roller according to an embodiment of the present disclosure.
Figure 3:
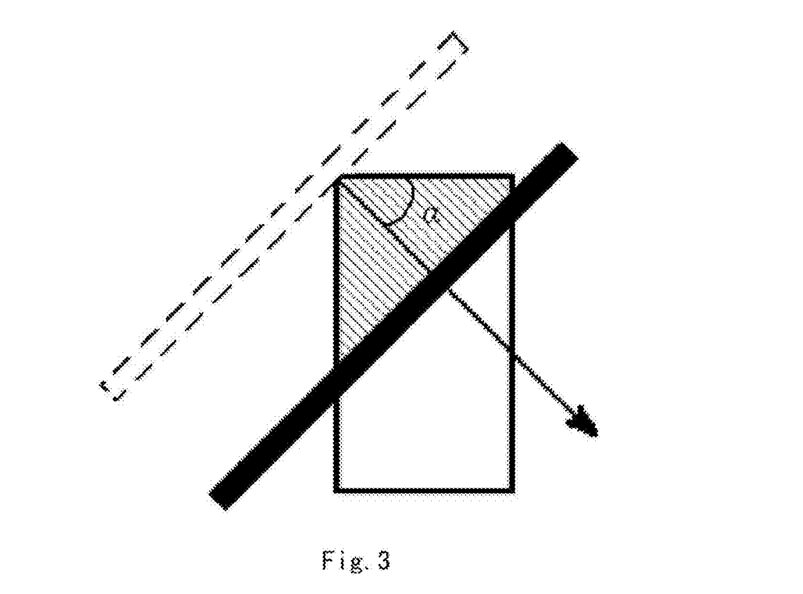
Figure 4:
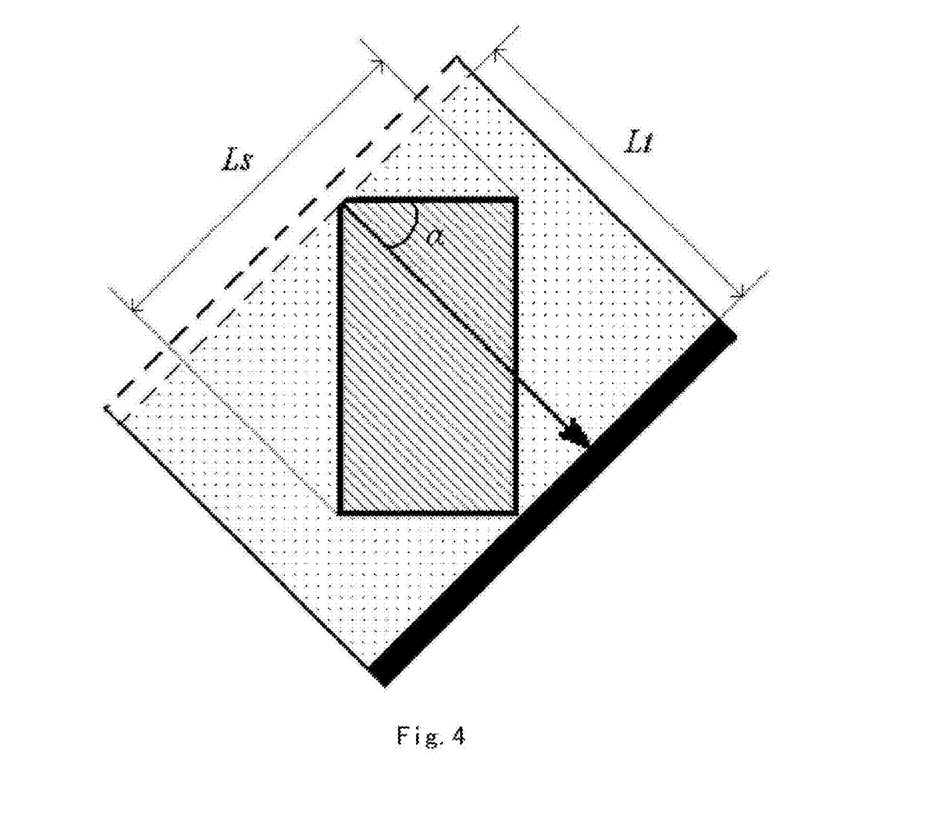

Specifically, FIG. 2 to FIG. 4 show top schematic views of the base table in the rolling process of the above described attaching roller, wherein the film material is rectangular. Referring to FIG. 2, the attaching roller (as shown by an oblique bold line in FIG. 2) presses a corner of the film material (as shown by a white rectangle in FIG. 2), and rolls along a preset direction (as shown by an arrow in FIG. 2). The included angle between the preset direction and the short side of the film material is $\alpha$, and preferably $\alpha=45°$ so that the preset direction is coincident with a bisector of a corner of the film material. The purpose of such setting is so that the long side and the short side of the film material can have directional symmetry during the rolling process of the attaching roller, which is advantageous to the smooth performance of the attaching process. Of course, in specific environment, the included angle between the preset direction and the bisector of the corner of the film material is smaller than 30° (i.e., $15°<\alpha<75°$ in order to adapt different application situations.

Referring to FIG. 3, during the process the attaching roller is rolling along the an angle bisector of a right angle, the rolling trajectory plane where the attaching roller rolls on the film material (as shown by a shade area in FIG. 3) generally increase starting at an vertex of the right angle, so that a linear bubble can be prevented from generating at the edge of the film material where the attaching roller directly presses; meanwhile the included angle between the attaching roller and either one of the four sides of the film material is 45°, which is advantageous to the smooth performance of the attaching process.

Referring to FIG. 4, after the rolling trajectory plane (as shown by the dot area in FIG. 4) of the attaching roller covers the whole film material, the film material and the backing material can be stably joined together by the adhesive layer. As can be seen from FIG. 4, in order to achieve attachment by only one rolling operation, the rolling trajectory plane in only one rolling operation of the attaching roller should cover the entire film. For this purpose, the length of the attaching roller should be larger than the projected length (as shown by Ls in FIG. 4) of the film material along a direction perpendicular to the above mentioned preset direction in a plane where film material lies. At the same time, the whole rolling distance (as shown by Lt in FIG. 4) of the attaching roller in the attaching process is larger than the projected length of the film material along the preset direction in a plane where film material lies. Of course, in order to let the attaching roller adapt to the attaching process along several preset directions, the length of the attaching roller is no less than the diagonal length of the rectangular film material (the attaching roller is configured to adapt to films with different specifications, that is to say, the length of the attaching roller is no less than the maximum of the diagonal length of the films). Herein, the length of the short side of the rectangular film material is $L_a$, the length of the long side is $L_b$, the included angle between the preset direction and the short side is $\alpha$, and they satisfy the relationship $Ls=L_a \sin\alpha + L_b \cos\alpha$. The rolling distance Lt should satisfy the relationship $Lt > L_a \cos\alpha + L_b \sin\alpha$.

In general, by attaching the film material using an attaching roller at an angle to the film material, instead of attaching the film material directly at one side by an attaching roller, the present disclosure can solve the problem that a linear bubble is easily to be generated at the edge of the film material in the attaching process. Moreover, comparing to the prior art, since the present attaching method can avoid linear bubble forming, other special processes are not needed to apply to the film material so that the production cost of the attaching process will be decreased. In addition, because no linear bubble will be generated, the non-display area does not need to be increased, which is advantageous to the development of the narrowing of the frame of the display device.

In present description, it should be noted that: the terms used herein to describing orientations or positional relationships such as "upper" and "lower", are based on the orientation or positional relationship illustrated in the drawings, which are only used for ease of description and simplicity of description, and not to suggest or imply that the mentioned devices or elements must adopt certain orientation, construct or operate with certain orientation, and thereby those terms will not restrict the present disclosure in this respect. In present description, it should be noted that unless otherwise specified or restricted, the terms "mount", "connect", "couple" as used herein can be understood in broad sense, for example, it can be fixedly connected, or removably connected or integrally connected; it can be mechanically connected or electrically connected; it can be directly connected or can be connected through intermediate element. Those skilled the art of the present disclosure can understand the specific meanings of those terms according to actual situation.

Besides, terms such as "first", "second", "third" or the like are only used for the purpose of description, and should not be considered as to indicate or imply relative importance. Furthermore, terms such as "include" or "comprise" or other derivatives are non-exclusive include, so that processes, methods, articles or apparatuses comprising a series of elements not only comprise those elements but also comprise other non-listed elements, or comprise some elements inherent to the processes, methods, articles or apparatus. Without any more limitation, elements defined by phase "comprising a . . . " do not eliminate other similar elements present in the processes, methods, articles or apparatus.

The above embodiments are only used to illustrate the technical solution of the present disclosure, not limit it. Although the present disclosure is explained in detail referring to the above embodiments, those ordinary skilled in the art should understand that the technical solution in the above embodiments can be modified or parts or features of the technical solution can be replaced by equivalent parts or features. Those modifications and replacements are within the spirit and scope of the present disclosure.

The invention claimed is:

1. A film material attaching method comprising:
   (step 1) putting a film material on a backing material on a base table wherein a side of the film material with an adhesive layer facing towards the backing material is to be attached; and
   (step 2) pressing a corner of the film material on the base table by an attaching roller;
   wherein the attaching roller will roll along a preset direction;
   wherein an included angle between the preset direction and either side of the corner of the film material is smaller than an angle of the corner of the film material;
   wherein step 2 further comprises:
      measuring an included angle between an actual rolling direction of the attaching roller and either side of the corner of the film material; and
      regulating the rolling direction of the attaching roller if the included angle between the actual rolling direction of the attaching roller and either side of the corner of the film material is not smaller than the angle of the corner of the film material so that the included angle between the actual rolling direction of the attaching roller and either side of the corner of the film material is smaller than the angle of the corner of the film material.

2. The method of claim 1 wherein an included angle between the preset direction and an angle bisector of the corner of the film material is smaller than a third of the angle of the corner of the film material.

3. The method of claim 2 wherein the preset direction is coincident with the angle bisector of the corner of the film material.

4. The method of claim 1 wherein at least one of:
   an attaching pressure applied by the attaching roller in a first half of a whole rolling course is smaller than an average attaching pressure applied by the attaching roller for the whole rolling course; and
   a rolling speed of the attaching roller in the first half of the whole rolling course is smaller than an average rolling speed of the attaching roller for the whole rolling course.

5. The method of claim 1 wherein a rolling trajectory plane of the attaching roller covers the film material.

6. The method of claim 5 wherein a length of the attaching roller is larger than a projected length of the film material at a plane where the film material lies along a direction perpendicular to the preset direction.

7. The method of claim 6 wherein the film material is rectangular;
   wherein the length of the attaching roller is no less than a diagonal length of the rectangular film material.

8. The method of claim 5 wherein a rolling distance of the attaching roller is larger than a projected length of the film material at a plane where the film material lies along the preset direction.

9. The method of claim 8 wherein the film material is rectangular;
   wherein a short side of the film material has a length $L_a$;
   wherein a long side of the film material has a length $L_b$;
   wherein an included angle between the preset direction and the short side of the film material is $\alpha$;
   wherein the rolling distance of the attaching roller is Lt;
   wherein $Lt > L_a \cos\alpha + L_b \sin\alpha$.

10. The method of claim 1 wherein the adhesive layer comprises optically clear adhesive.

11. The method of claim 10 wherein the film material comprises one of a polarizer, a reflector, an electronic paper, an isolating paper, or a touch control conductive thin film.

12. A film material attachment device comprising:
   a base table wherein the base table is used to carry a backing material needing to attach a film material;
   an attaching roller;
   wherein the attaching roller is located above the base table;
   wherein the attaching roller is configured to roll and press the film material;
   a rolling control unit;
   wherein the rolling control unit is configured to control the attaching roller so that the attaching roller can press a corner of the film material and roll along a preset direction;
   wherein an included angle between the preset direction and either side of the corner of the film material is smaller than an angle of the corner of the film material; and
   wherein the rolling control unit comprises:
      an angle measurement device configured to measure an included angle between an actual rolling direction of the attaching roller and either side of the corner of the film material; and
      an actuation device configured to regulate the rolling direction of the attaching roller when the included angle between the actual rolling direction of the attaching roller and either side of the corner of the film material is not smaller than the angle of the corner of the film material so that the included angle between the actual rolling direction of the attaching roller and either side of the corner of the film material will be smaller than the angle of the corner of the film material.

13. The film material attachment device of claim 12 wherein the rolling control unit comprises:
   a pressure measurement device wherein the pressure measurement device is configured to measure a pressure applied to the film material by the attaching roller; and
   a pressure control device wherein the pressure control device is configured to control the pressure applied to the film material by the attaching roller so that the pressure applied by the attaching roller during a first half of a whole rolling course is smaller than an average pressure applied by the attaching roller for the whole rolling course.

14. The film material attachment device of claim 12 wherein an included angle between the preset direction and an angle bisector of the corner of the film material is smaller than a third of the angle of the corner of the film material.

15. The film material attachment device of claim 12 wherein the rolling control unit is further configured to control a rolling speed of the attaching roller so that the rolling speed of the attaching roller in the first half of the whole rolling course is smaller than an average rolling speed of the attaching roller for the whole rolling course.

16. The film material attachment device according to claim 12 wherein a rolling trajectory plane of the attaching roller covers the film material.

17. The film material attachment device of claim 16 wherein a length of the attaching roller is larger than a projected length of the film material at a plane where the film material lies along a direction perpendicular to the preset direction.

18. The film material attachment device of claim 17 wherein the film material is rectangular;
   wherein the length of the attaching roller is no less than a diagonal length of the rectangular film material.

* * * * *